United States Patent
Furgal et al.

[11] 3,732,652
[45] May 15, 1973

[54] NON-WOVEN, SPONGE LAMINATED CLOTH

[75] Inventors: Henry P. Furgal, Bernardsville; Pasquale J. Falivene; Cesare N. Marchesani, both of Union City, all of N.J.

[73] Assignee: Colgate-Palmolive Company, New York, N.Y.

[22] Filed: Apr. 14, 1971

[21] Appl. No.: 134,003

[52] U.S. Cl. .....................51/401, 51/297, 401/196
[51] Int. Cl. ..........................................B24d 11/00
[58] Field of Search ............51/295–297, 401–404; 15/104.93, 104.44; 401/196, 201

[56] References Cited

UNITED STATES PATENTS

| 2,780,533 | 2/1957 | Hurst | 51/297 |
| 3,073,716 | 11/1963 | Gilchrist | 51/295 X |
| 3,080,688 | 3/1963 | Politzer | 51/295 X |

Primary Examiner—Othell M. Simpson
Attorney—Herbert S. Sylvester, Murray M. Grill, Norman Blumenkopf, Ronald S. Cornell, Thomas J. Corum, and Richard N. Miller

[57] ABSTRACT

A heavy duty scouring cloth suitable for cleaning, dusting, or waxing, and especially adapted for use as a bathroom mat, table pad, or place mat, which includes an inner sponge layer laminated between outer non-woven fabric layers. The fabric layers are themselves formed of laminates of aligned fibers.

7 Claims, 6 Drawing Figures

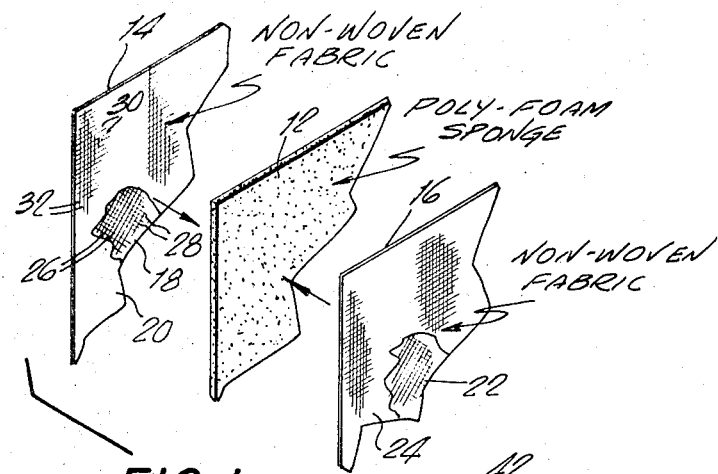
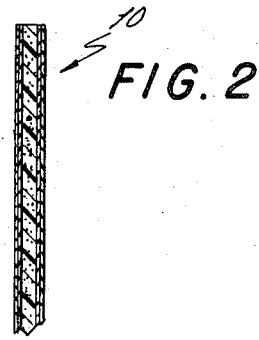
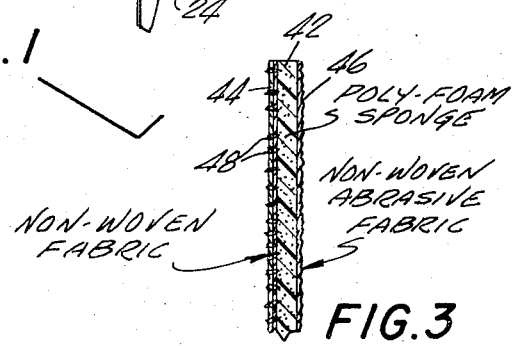
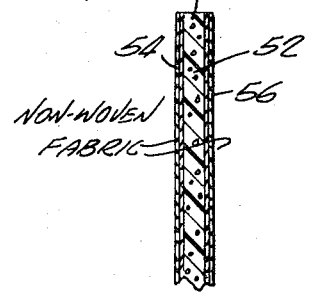
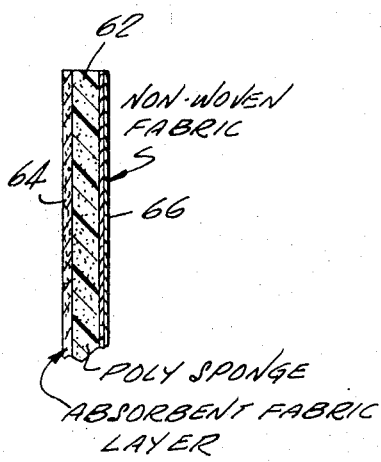
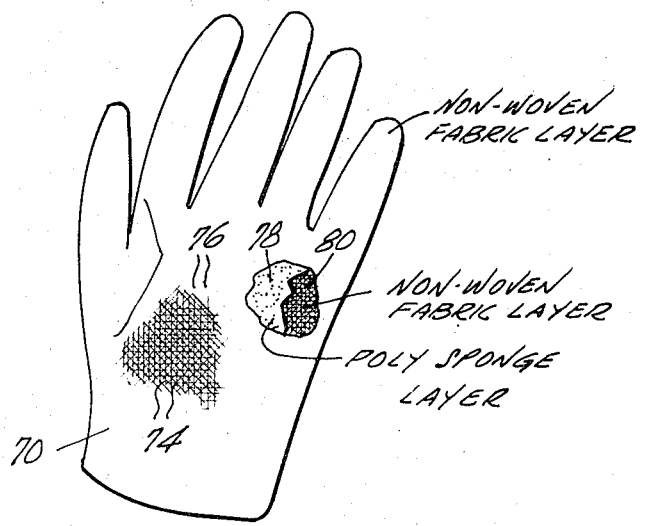

NON-WOVEN, SPONGE LAMINATED CLOTH

This invention relates to a heavy duty scouring cloth for use as a cleaning, dusting, or waxing device.

In the past, various types of laminated scouring pads have been fabricated. Generally, these included the concept of bonding a cloth to a rather thick sponge preferably on one side thereof. However, both the relatively thick sponges and woven fabrics are not sufficiently resilient and flexible and the woven fabrics generally are not in themselves sufficiently absorbent or porous to be satisfactory for use as a contact surface of a sponge.

Various types of non-woven fabrics have appeared on the market, one of which is sold under the trademark "Handi Wipes." The present invention overcomes the disadvantages of the prior art cleansing devices by utilizing the concept of bonding a non-woven fabric of this type which is formed of laminates of aligned fibers, to a polyurethane foam sponge in a manner wherein the non-woven fabric provides for a highly effective scouring surface which is also quite absorbent. Further, the non-woven fabric is sufficiently porous to permit abrasive material to pass therethrough and to provide a highly effective scouring surface as may be so desired.

It is therefore the primary object of the present invention to provide a heavy duty scouring cloth that can be made by means of bonding a relatively thin sheet of sponge between sheets of non-woven synthetic fabric in a manner so that the resultant scouring cloth is sufficiently flexible and resilient and highly absorbent to provide for an effective cleansing action.

A further object of the present invention resides in the provision of a cleansing cloth in which the sponge inner sheet may be impregnated with a detergent, wax, or the like, or may have embedded therein abrasive particles which extend between the fibers of the laminates of the non-woven fabric for enhancing the scouring capabilities of this invention.

Yet another object of the invention resides in the provision of a scouring cloth that may be formed in the shape of a glove. It is also within the concept of the invention to utilize a wax impregnated cloth in the shape of a glove or mitten.

These, together with the various ancillary objects and features of the present invention, which will become apparent as the following description proceeds, are attained by this non-woven, sponge laminated cloth, preferred embodiments of which are illustrated in the accompanying drawing, by way of example only, wherein:

FIG. 1 is a partial exploded perspective view illustrating the component elements of the present invention;

FIG. 2 is a sectional detail view illustrating the construction of the invention in a bonded condition;

FIG. 3 is a sectional detail view, similar to FIG. 2, but of a modified form of the invention;

FIG. 4 is a sectional detail view, similar to FIG. 2, but illustrating another form of the invention;

FIG. 5 is a sectional detail view illustrating a further embodiment of the invention; and, FIG. 6 is a perspective view with parts broken away to show other parts in detail of a glove constructed in accordance with the concepts of this invention.

With continuing reference to the accompanying drawing, wherein like reference numerals designate similar parts throughout the various views, reference numeral 10 is used to generally designate a heavy duty scouring cloth constructed in accordance with the concepts of the present invention. The heavy duty scouring cloth includes an inner sheet 12. This sheet 12 is constructed in the form of a sponge and preferably of polyurethane foam. The polyurethane foam is preferably of an open cell type and is highly absorbent. Outer sheets 14 and 16 of a non-woven fabric such as the material now sold under the trade name "Handi Wipes" are bonded to the innersheet 12. Each of the sheets 14 and 16 include laminates 18, 20 and 22, 24 respectively. It is to be noted that the laminate 18 includes discrete fibers 26 which extend parallel to each other and other fibers 28 which extend perpendicular to the fibers 26. Likewise, laminate 20 includes fibers 30 which extend parallel to each other and fibers 32 which extend normal to the fibers 30. The laminate 20 is positioned with respect to the laminate 18 in such a manner that a 45° angle is intercepted between the respective fibers 18, 20 and 30, 32. The laminates 22 and 24 have their fibers arranged in the same manner as to the laminates 18 and 20. Thus, there is constructed a heavy duty scouring cloth which is basically very economical because it is usable and reusable and has all of the multipurpose wet cleaning uses of the others scouring cloths, yet which will rinse particularly clean and fresh after repeated uses because of its comparatively inner composition. The scouring cloth is soft, strong and absorbent.

In FIG. 3 there is illustrated an embodiment of the invention wherein the sponge sheet 52 formed of polyurethane foam is sandwiched between two non-woven sheets of fabric 44 and 46. The sheet 44 may be similar to the sheet 14. However, the sheet 46 may be a non-woven abrasive fabric or may be similar to the sheet 16. Embedded in the sponge sheet 42 and extending between the fibers in the non-woven fabric laminates of the sheet 44 are abrasive particles 46. These abrasive particles are clampingly held between the fibers which intercept each other at the forty-five degree angles as in the manner of laminates 18 and 20 so that they are held in place and given a further discrete motion based on the pulling of the various portions of the non-woven sheet 44 separate and distinct from the motion induced on the outer sheet by the user, thereby achieving an additional advantageous scouring function.

Referring now to the embodiment shown in FIG. 4, an arrangement is shown wherein the sponge sheet 44 is laminated between two non-woven sheets 54 and 56. The sponge is impregnated with any suitable detergent, wax, or the like, which is dispensed by cleansing motion of the cloth when in use. The detergent or like composition may be released upon the addition of water or other suitable fluid.

In the embodiment shown in FIG. 5, there is illustrated a sponge sheet 62 which has two non-woven sheets 64 and 66. The sheet 64 may be a particularly absorbent type material in the form of additional sponge like composition or the like.

The glove or mitten shown in FIG. 6 is formed from a bonded laminated of a sponge layer 78 between another sheets 70 and 80 of a non-woven fabric. The fibers 74, 76, etc of the sheet 70 are arranged in the same manner as that of the sheet 20. The foam sheet 70 may be impregnated with wax or like material much in the same manner as the embodiment shown in FIG. 4.

A latitude of modification, substitution and change is intended in the foregoing disclosure, and in some instances, some features of this invention may be employed without a corresponding use of other features.

We claim:

1. A heavy duty scouring cloth comprising an inner relatively thin sheet of porous absorbent material, a pair of outer sheets of non-woven synthetic fabric on the opposite side of said inner sheet bonded to said inner sheet, each of said outer sheets including an inner and outer laminates, each of said laminates including a first plurality of discrete fibers extending parallel to each other and other discrete fibers extending normal to said first plurality of fibers, the fibers of each laminate extending at a 45° angle to each other.

2. A heavy duty scouring cloth comprising an inner relatively thin sheet of porous absorbent material, a pair of outer sheets of non-woven synthetic fabric on the opposite side of said inner sheet bonded to said inner sheet, each of said outer sheets including an inner and outer laminates, each of said laminates including a first plurality of discrete fibers extending parallel to each other and other discrete fibers extending normal to said first plurality of fibers, the fibers of each laminate extending at an acute angle to each other.

3. A scouring cloth according to claim 2, wherein said inner sheet is a sponge of polyurethane foam.

4. A scouring cloth according to claim 3, wherein said inner sheet is impregnated with a detergent.

5. A scouring cloth according to claim 4, wherein said inner sheet has a plurality of abrasive granules partially embedded therein and extending through at least one of said outer sheets, the fibers in said one outer sheet engaging said granules.

6. A scouring cloth according to claim 5, wherein said inner sheet is impregnated with wax.

7. A scouring cloth according to claim 6, wherein said cloth is in the shape of a glove.

* * * * *